(12) United States Patent
Wallace et al.

(10) Patent No.: US 7,206,354 B2
(45) Date of Patent: Apr. 17, 2007

(54) CALIBRATION OF DOWNLINK AND UPLINK CHANNEL RESPONSES IN A WIRELESS MIMO COMMUNICATION SYSTEM

(75) Inventors: Mark S. Wallace, Bedford, MA (US); John W. Ketchum, Harvard, MA (US); J. Rodney Walton, Carlisle, MA (US); Steven J. Howard, Ashland, MA (US)

(73) Assignee: Qualcomm Incorporated, San Diego, CA (US)

( * ) Notice: Subject to any disclaimer, the term of this patent is extended or adjusted under 35 U.S.C. 154(b) by 575 days.

(21) Appl. No.: 10/783,175

(22) Filed: Feb. 19, 2004

(65) Prior Publication Data

US 2005/0185728 A1     Aug. 25, 2005

(51) Int. Cl.
H04B 7/02     (2006.01)
H04K 1/10     (2006.01)

(52) U.S. Cl. .................................. 375/267; 375/260
(58) Field of Classification Search ................ 375/144, 375/260, 267; 370/208, 321, 337, 344; 455/500, 455/88
See application file for complete search history.

(56) References Cited

U.S. PATENT DOCUMENTS

| | | | | |
|---|---|---|---|---|
| 6,144,711 A | * | 11/2000 | Raleigh et al. | 375/347 |
| 2002/0191703 A1 | * | 12/2002 | Ling et al. | 375/267 |
| 2003/0189999 A1 | * | 10/2003 | Kadous | 375/349 |
| 2004/0082356 A1 | * | 4/2004 | Walton et al. | 455/522 |
| 2004/0085939 A1 | | 5/2004 | Wallace et al. | |
| 2004/0087324 A1 | | 5/2004 | Ketchum et al. | |
| 2004/0146117 A1 | * | 7/2004 | Subramaniam et al. | 375/260 |

OTHER PUBLICATIONS

Bruhl et al., "Investigation of Front-end Requirements for MIMO-Systems Using Dowlink pre-Distortion," The Institution of Electrical Engineers, European Personal Mobile Communications Conference, London, Great Britain, pp. 472-476 (2003) XP-002330243.

(Continued)

*Primary Examiner*—Young T. Tse
(74) *Attorney, Agent, or Firm*—Thomas R. Rouse; Sandip (Micky) S. Minhas; Dmitry R. Milikovsky

(57) ABSTRACT

The downlink and uplink are calibrated to account for differences in the responses of transmit and receive chains at an access point and a user terminal. For initial calibration, the access point and user terminal transmit MIMO pilots on the downlink and uplink, which are used to derive channel estimates including the responses of the applicable transmit/receive chains. Correction matrices $\hat{K}_{ap}$ and $\hat{K}_{ut}$ are derived based on these channel estimates and thereafter used by the access point and user terminal, respectively. For follow-on calibration, one entity transmits a MIMO pilot and a steered reference. The other entity derives a first transmit matrix based on the steered reference and a second transmit matrix based on the MIMO pilot and calibration error matrices $Q_{ap}$ and $Q_{ut}$, which contain estimates of the errors in $\hat{K}_{ap}$ and $\hat{K}_{ut}$, respectively. $Q_{ap}$ and $Q_{ut}$ may be iteratively adjusted based on an adaptive procedure to minimize the errors between the two transmit matrices.

43 Claims, 6 Drawing Sheets

OTHER PUBLICATIONS

Bourdoux et al., "Non-reciprocal transceivers in OFDM/SDMA systems: Impact and Mitigation," IEEE Radio and Wireless conference, pp. 183-186 (2003) XP-010656728.

Bem et al., "Smart antennas for mobile communications systems," International Conference on Microwaves, Radar and Wireless communications, Institute of Telecommunications and Acoustics, Wroclaw University of Technology, vol. 2, pp. 120-130 (2000) XP-01010537479.

Liu et al., "OFDM-MIMO WLAN AP Front-end Gain and Phase Mismatch Calibration," IEEE Radio and Wireless Conference, pp. 151-154 (2004) XP-002330244.

Jungnickel et al., "A MIMO system with reciprocal transceivers for the time-division duplex mode," Antennas and Propagation Society Symposium, IEEE, vol. 2, pp. 1267-1270 (2004) XP-010721570.

* cited by examiner

US 7,206,354 B2

CALIBRATION OF DOWNLINK AND UPLINK CHANNEL RESPONSES IN A WIRELESS MIMO COMMUNICATION SYSTEM

BACKGROUND

1. Field

The present invention relates generally to communication, and more specifically to techniques for calibrating downlink and uplink channel responses in a wireless multiple-input multiple-output (MIMO) communication system.

2. Background

A MIMO system employs multiple ($N_T$) transmit antennas and multiple ($N_R$) receive antennas for data transmission. A MIMO channel formed by the $N_T$ transmit antennas and $N_R$ receive antennas may be decomposed into $N_S$ spatial channels, where $N_S \leq \min\{N_T, N_R\}$. The $N_S$ spatial channels may be used to transmit data in parallel to achieve higher overall throughput or redundantly to achieve greater reliability.

To achieve high performance, it is often necessary to know the response of the MIMO channel. For example, an access point may need to know the response of a downlink channel in order to perform spatial processing for a downlink transmission to a user terminal. In one conventional channel estimation technique, the access point transmits a pilot on the downlink, and the user terminal estimates the downlink channel response based on the pilot and sends the downlink channel response estimate back to the access point. This channel estimation technique utilizes uplink resources and further incurs a delay to send back the channel response estimate, both of which are undesirable.

A TDD system uses a single frequency band for both the downlink and uplink, with the downlink being allocated a portion of the time and the uplink being allocated the remaining portion of the time. For a TDD system, the downlink and uplink channel responses may be assumed to be reciprocal of one another. That is, if $H$ represents a channel response matrix from antenna array A to antenna array B, then a reciprocal channel implies that the coupling from array B to array A is given by $H^T$ where $H^T$ denotes the transpose of $H$. With a reciprocal channel, the channel response for one link (e.g., the downlink) may be estimated based on a pilot received via the other link (e.g., the uplink).

The access point and user terminal both utilize transmit and receive chains for transmission and reception, respectively. A downlink transmission would then observe an "effective" downlink channel response that includes the responses of the transmit chain at the access point and the receive chain at the user terminal. Correspondingly, an uplink transmission would observe an effective uplink channel response that includes the responses of the transmit chain at the user terminal and the receive chain at the access point. The responses of the transmit and receive chains at the access point are typically different from the responses of the transmit and receive chains at the user terminal. As a result, the effective downlink and uplink channel responses are typically not reciprocal of one another. If the channel response estimate obtained for one link is used for spatial processing for the other link, then any difference in the responses of the transmit/receive chains at the access point and user terminal would represent error that, if not determined and accounted for, may degrade performance.

There is, therefore, a need in the art for techniques to calibrate the downlink and uplink channel responses in a TDD MIMO system.

SUMMARY

Techniques to calibrate the downlink and uplink channel responses to account for differences in the responses of the transmit and receive chains at the access point and user terminal are described herein. After calibration, a channel response estimate obtained for one link may be used as a channel response estimate for the other link. This can simplify channel estimation and spatial processing.

The calibration may be separated into two parts—initial calibration and follow-on calibration. For the initial calibration, the access point and user terminal transmit MIMO pilots (described below) on the downlink and uplink, respectively. The MIMO pilots are used to derive "effective" downlink and uplink channel response estimates, $\hat{H}_{dn}$ and $\hat{H}_{up}$, which include the responses of the applicable transmit/receive chains. The channel estimates $\hat{H}_{dn}$ and $\hat{H}_{up}$ are used to derive correction matrices $\hat{K}_{ap}$ and $\hat{K}_{ut}$, which are thereafter used by the access point and user terminal, respectively, to account for the responses of their transmit/receive chains, as described below.

For the follow-on calibration, one entity (e.g., the access point) transmits a MIMO pilot and a steered reference (described below). The other entity (e.g., the user terminal) derives (1) an "actual received" transmit matrix $\tilde{V}_a$ based on the steered reference and (2) a "hypothesized" transmit matrix $\tilde{V}_{hyp}$ based on the MIMO pilot and calibration error matrices $Q_{ap}$ and $Q_{ut}$. The matrices $Q_{ap}$ and $Q_{ut}$ contain guesses or estimates of the errors in the correction matrices $\hat{K}_{ap}$ and $\hat{K}_{ut}$, respectively. The difference between the transmit matrices $\tilde{V}_a$ and $\tilde{V}_{hyp}$ are indicative of the accuracy of the estimates of the errors in the correction matrices. The matrices $Q_{ap}$ and $Q_{ut}$ may be adjusted based on an adaptive procedure to minimize the error between $\tilde{V}_a$ and $\tilde{V}_{hyp}$. Several adaptive procedures to iteratively adjust the matrices $Q_{ap}$ and $Q_{ut}$ are described below. The correction matrices $\hat{K}_{ap}$ and $\hat{K}_{ut}$ may thereafter be updated by the calibration error matrices $Q_{ap}$ and $Q_{ut}$, respectively.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The calibration techniques described herein may be used for single-carrier as well as multi-carrier TDD MIMO systems. For clarity, these techniques are described for a single-carrier TDD MIMO system.

Figure 1:
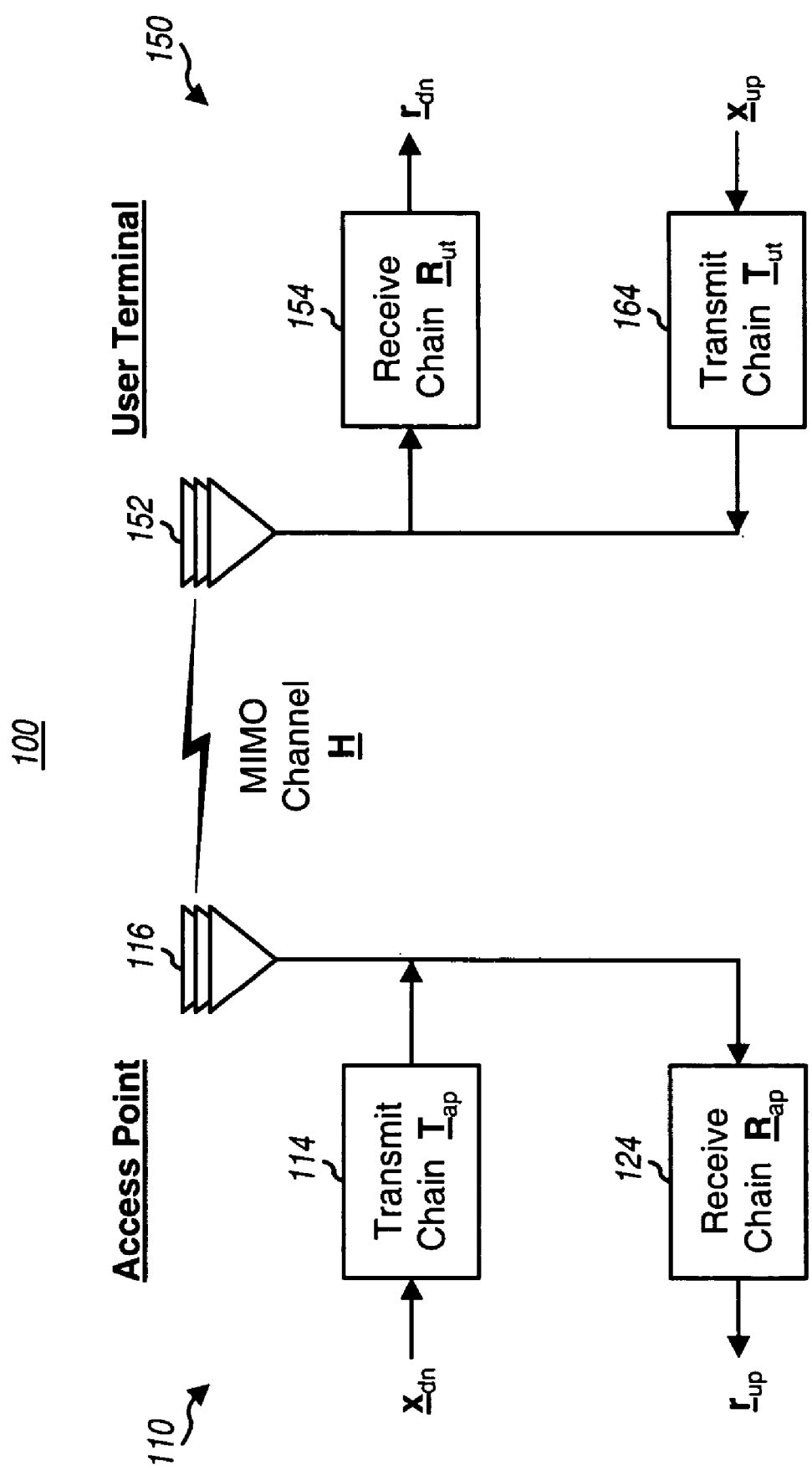
FIG. 1 shows the transmit and receive portions at the access point and user terminal in the TDD MIMO system.

FIG. 1 shows a block diagram of the transmit and receive portions at an access point 110 and a user terminal 150 in a TDD MIMO system 100. For the downlink, at access point 110, transmit symbols (denoted by a vector $x_{dn}$) are processed by a transmit chain 114 and transmitted from $N_{ap}$ antennas 116 and over a wireless MIMO channel having a response of H. At user terminal 150, the $N_{ap}$ downlink signals are received by $N_{ut}$ antennas 152 and processed by a receive chain 154 to obtain received symbols (denoted by a vector $r_{dn}$). The processing by transmit chain 114 typically includes digital-to-analog conversion, amplification, filtering, frequency upconversion, and so on. The processing by receive chain 154 typically includes frequency downconversion, amplification, filtering, analog-to-digital conversion, and so on.

For the uplink, at user terminal 150, transmit symbols (denoted by a vector $x_{up}$) are processed by a transmit chain 164 and transmitted from $N_{ut}$ antennas 152 and over the MIMO channel. At access point 110, the $N_{ut}$ uplink signals are received by $N_{ap}$ antennas 116 and processed by a receive chain 124 to obtain received symbols (denoted by a vector $r_{up}$).

For the downlink, the receive vector at the user terminal may be expressed as:

$$r_{dn} = R_{ut} H T_{ap} x_{dn}, \qquad \text{Eq (1)}$$

where $x_{dn}$ is the vector with $N_{ap}$ transmit symbols sent from $N_{ap}$ access point antennas;

$r_{dn}$ is the vector with $N_{ut}$ received symbols obtained via $N_{ut}$ user terminal antennas;

$T_{ap}$ is an $N_{ap} \times N_{ap}$ diagonal matrix with $N_{ap}$ complex gains for the access point transmit chain, one complex gain for each access point antenna;

$R_{ut}$ is an $N_{ut} \times N_{ut}$ diagonal matrix with $N_{ut}$ complex gains for the user terminal receive chain, one complex gain for each user terminal antenna; and H is the $N_{ut} \times N_{ap}$ channel response matrix for the downlink.

The responses of the transmit/receive chains and the MIMO channel are typically a function of frequency. For simplicity, a flat-fading channel with a flat frequency response is assumed.

For the uplink, the receive vector at the access point may be expressed as:

$$r_{up} = R_{ap} H^T T_{ut} x_{up}, \qquad \text{Eq (2)}$$

where $x_{up}$ is the vector with $N_{ut}$ transmit symbols sent from $N_{ut}$ user terminal antennas;

$r_{up}$ is the vector with $N_{ap}$ received symbols obtained via $N_{ap}$ access point antennas;

$T_{ut}$ is an $N_{ut} \times N_{ut}$ diagonal matrix with $N_{ut}$ complex gains for the user terminal transmit chain, one complex gain for each user terminal antenna;

$R_{ut}$ is an $N_{ap} \times N_{ap}$ diagonal matrix with $N_{ap}$ complex gains for the access point receive chain, one complex gain for each access point antenna; and $H^T$ is the $N_{ap} \times N_{ut}$ channel response matrix for the uplink.

From equations (1) and (2), the "effective" downlink and uplink channel responses, $H_{dn}$ and $H_{up}$, which include the responses of the applicable transmit and receive chains, may be expressed as:

$$H_{dn} = R_{ut} H T_{ap} \text{ and } H_{up} = R_{ap} H^T T_{ut}. \qquad \text{Eq (3)}$$

Combining the two equations in equation set (3), the following may be obtained:

$$H_{up}^T = T_{ut} R_{ut}^{-1} H_{dn} T_{ap}^{-1} R_{ap} = K_{ut}^{-1} H_{dn} K_{ap} \text{ or } H_{up} = (K_{ut}^{-1} H_{dn} K_{ap})^T, \qquad \text{Eq (4)}$$

where $K_{ap} = T_{ap}^{-1} R_{ap}$ and $K_{ut} = T_{ut}^{-1} R_{ut}$. $K_{ap}$ is an $N_{ap} \times N_{ap}$ diagonal matrix for the access point and obtained by a ratio of the receive chain response $R_{ap}$ to the transmit chain response $T_{ap}$, where the ratio is taken element-by-element. Similarly, $K_{ut}$ is an $N_{ut} \times N_{ut}$ diagonal matrix for the user terminal and obtained by a ratio of the receive chain response $R_{ut}$ to the transmit chain response $T_{ut}$.

Equation (4) may also be expressed as:

$$H_{cup} = H_{up} K_{ut} = (H_{dn} K_{ap})^T = H_{cdn}^T, \qquad \text{Eq (5)}$$

where $H_{cup}$ denotes the calibrated channel response for the uplink; and $H_{cdn}$ denotes the calibrated channel response for the downlink.

The matrices $K_{ap}$ and $K_{ut}$ include values that account for differences in the transmit/receive chains at the access point and user terminal. The application of the diagonal matrices, $K_{ap}$ and $K_{ut}$, to the effective downlink and uplink channel responses, as shown in equation (5), allows the calibrated channel response for one link to be expressed by the calibrated channel response for the other link.

Initial calibration may be performed to determine the matrices $K_{ap}$ and $K_{ut}$. Typically, the true channel response H and the transmit/receive chain responses are not known nor can they be exactly or easily ascertained. Instead, the effective downlink and uplink channel responses, $H_{dn}$ and $H_{up}$, may be estimated based on MIMO pilots sent on the downlink and uplink, respectively. A MIMO pilot is a pilot comprised of $N_T$ pilot transmissions sent from $N_T$ transmit antennas, where the pilot transmission from each transmit antenna is identifiable by the receiving entity. This can be achieved, for example, by using a different orthogonal sequence for the pilot transmission from each transmit antenna. Estimates of the matrices $K_{ap}$ and $K_{ut}$ (which are called correction matrices $\hat{K}_{ap}$ and $\hat{K}_{ut}$) may then be derived based on the effective downlink and uplink channel response estimates, $\hat{H}_{dn}$ and $\hat{H}_{up}$, as described below. The matrices $\hat{K}_{ap}$ and $\hat{K}_{ut}$ include correction factors that can account for differences in the transmit/receive chains at the access point and user terminal.

Figure 2:
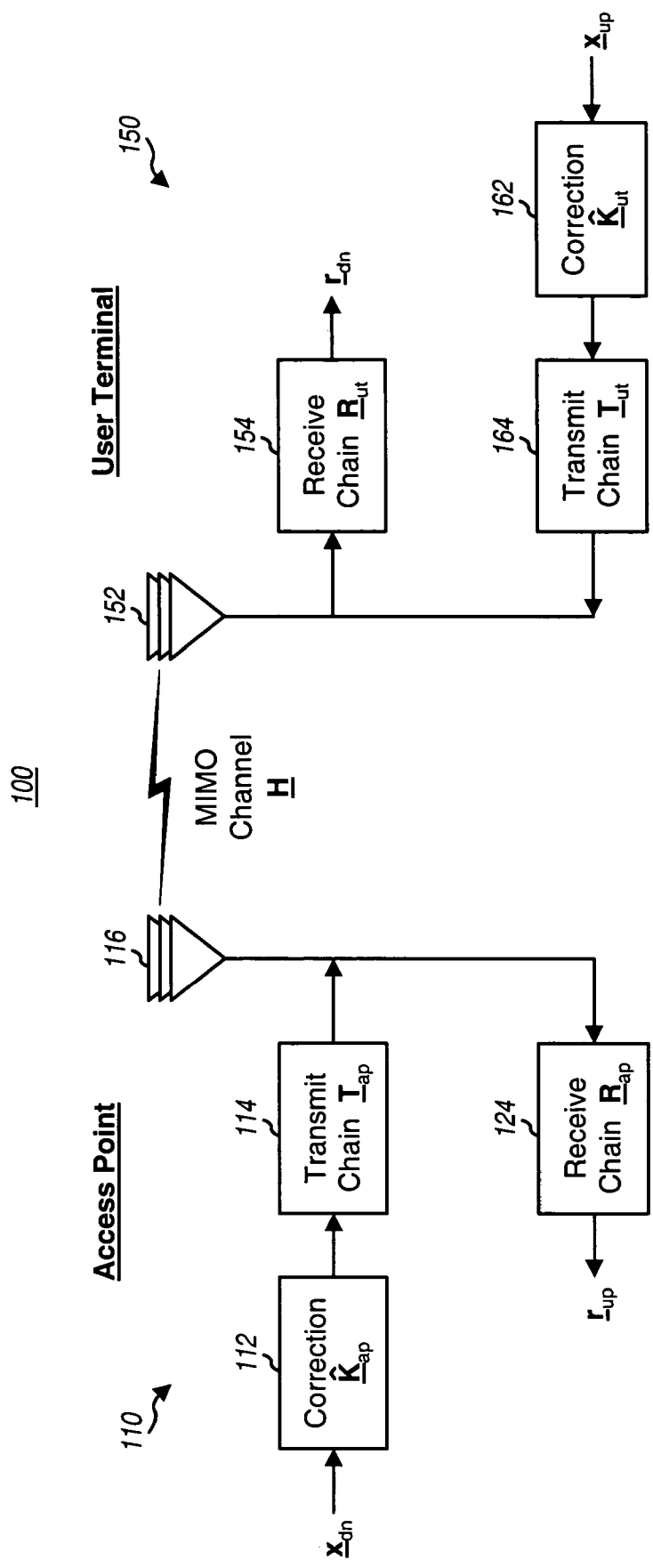
FIG. 2 shows the use of the correction matrices at the access point and user terminal to account for their transmit/receive chains.

FIG. 2 shows the use of the correction matrices $\hat{K}_{ap}$ and $\hat{K}_{ut}$ at access point 110 and user terminal 150. On the downlink, the transmit vector $x_{dn}$ is first multiplied with the correction matrix $\hat{K}_{ap}$ by a unit 112. The subsequent processing by transmit chain 114 and receive chain 154 for the downlink is as described in FIG. 1. Similarly, on the uplink, the transmit vector $x_{up}$ is first multiplied with the correction matrix $\hat{K}_{ut}$ by a unit 162. The subsequent processing by transmit chain 164 and a receive chain 124 for the uplink is also as described in FIG. 1.

For a MIMO system, data may be transmitted on $N_S$ eigenmodes of a MIMO channel. These eigenmodes may be viewed as orthogonal spatial channels of the MIMO channel. The channel response matrix H may be "diagonalized" to obtain the $N_S$ eigenmodes of the MIMO channel. This diagonalization may be achieved by performing either singular value decomposition of H or eigenvalue decomposition of a correlation matrix of H, which is $R = H^H H$, where $H^H$ denotes the conjugate transpose of H.

Table 1 shows the effective and calibrated channel responses for the downlink and uplink as well as the singular value decomposition of the calibrated downlink and uplink channel response matrices.

TABLE 1

Singular Value Decomposition

| | Downlink | Uplink |
|---|---|---|
| Effective Channel Response | $\underline{H}_{dn} = \underline{R}_{ut}\underline{H}\underline{T}_{ap}$ | $\underline{H}_{up} = \underline{R}_{ap}\underline{H}^T\underline{T}_{ut}$ |
| Calibrated Channel Response | $\underline{H}_{cdn} = \underline{H}_{dn}\underline{K}_{ap}$ | $\underline{H}_{cup} = \underline{H}_{up}\underline{K}_{ut}$ |
| Singular Value Decomposition of True Channel Response | $\underline{H}_{cdn} = \underline{V}_{ut}^*\underline{\Sigma}^T\underline{U}_{ap}^T$ | $\underline{H}_{cup} = \underline{U}_{ap}\underline{\Sigma}\underline{V}_{ut}^H$ |
| Singular Value Decomposition of Estimated Channel Response | $\hat{\underline{H}}_{cdn} = \hat{\underline{V}}_{ut}^*\hat{\underline{\Sigma}}^T\hat{\underline{U}}_{ap}^T$ | $\hat{\underline{H}}_{cup} = \hat{\underline{U}}_{ap}\hat{\underline{\Sigma}}\hat{\underline{V}}_{ut}^H$ |
| Unnormalized Transmit Matrices | $\hat{\underline{V}}_{ut}\hat{\underline{\Sigma}}^T = \hat{\underline{H}}_{cdn}\hat{\underline{U}}_{ap}$ | $\hat{\underline{U}}_{ap}\hat{\underline{\Sigma}} = \hat{\underline{H}}_{cup}\hat{\underline{V}}_{ut}$ |

In Table 1, $U_{ap}$ is an $N_{ap} \times N_{ap}$ unitary matrix of left eigenvectors of $H_{cup}$, $\Sigma$ is an $N_{ap} \times N_{ut}$ diagonal matrix of singular values of $H_{cup}$, $V_{ut}$ is an $N_{ut} \times N_{ut}$ unitary matrix of right eigenvectors of $H_{cup}$, and "*" denotes the complex conjugate. A unitary matrix M is characterized by the property $M^H M = I$, where I is the identity matrix. The matrices $V_{ut}^*$ and $U_{ap}^*$ are also matrices of left and right eigenvectors, respectively, of $H_{cdn}$. The matrices V, V*, $V^T$ and $V^H$ are different forms of the matrix V. For simplicity, reference to the matrices $U_{ap}$ and $U_{ut}$ in the following description may also refer to their other forms. The matrices $U_{ap}$ and $V_{ut}$ (which are also called transmit matrices) may be used by the access point and user terminal, respectively, for spatial processing and are denoted as such by their subscripts.

The singular value decomposition is described in further detail by Gilbert Strang entitled "Linear Algebra and Its Applications," Second Edition, Academic Press, 1980, which is incorporated herein by reference.

In a practical system, the matrices $H_{cdn}$ and $H_{cup}$ are not available. Instead, the user terminal can estimate the calibrated downlink channel response based on a MIMO pilot transmitted by the access point. The user terminal can then perform singular value decomposition of the calibrated downlink channel response estimate, $\hat{H}_{cdn}$, to obtain a diagonal matrix $\hat{\Sigma}$ and a matrix $\hat{V}_{ut}^*$ of left eigenvectors of $\hat{H}_{cdn}$, where the hat ("^") above each matrix indicates that it is an estimate of the actual matrix. Similarly, the access point can estimate the calibrated uplink channel response based on a MIMO pilot transmitted by the user terminal. The access point can then perform singular value decomposition of the calibrated uplink channel response estimate, $\hat{H}_{cup}$, to obtain the diagonal matrix, $\hat{\Sigma}$ and a matrix, $\hat{U}_{ap}$ of left eigenvectors of $\hat{H}_{cup}$.

Because of the reciprocal channel and the calibration, the singular value decomposition only needs to be performed by either the user terminal or the access point to obtain both matrices $\hat{V}_{ut}$ and $\hat{U}_{ap}$. For clarity, the following description is for an implementation whereby the user terminal obtains the calibrated downlink channel response estimate, $\hat{H}_{cdn}$, performs decomposition of $\hat{H}_{cdn}$, uses the matrix $\hat{V}_{ut}$ for spatial processing, and sends the matrix $\hat{U}_{ap}$ back to the access point using a steered reference, as described below. A steered reference (or steered pilot) is a pilot that is transmitted from all antennas and on the eigenmodes of the MIMO channel.

The user terminal may transmit an uplink steered reference, as follows:

$$x_{up,m} = \hat{K}_{ut}\hat{v}_{ut,m}p_m, \quad \text{Eq (6)}$$

where $p_m$ is a pilot symbol transmitted on eigenmode m for the steered reference;

$x_{up,m}$ is a transmit vector for the uplink steered reference for eigenmode m; and $\hat{v}_{ut,m}$ is the m-th eigenvector or column of $\hat{V}_{ut}$, where $\hat{V}_{ut} = [\hat{v}_{ut,1} \; \hat{v}_{ut,2} \; \ldots \; \hat{v}_{ut,N_{ut}}]$.

The received uplink steered reference at the access point may be expressed as:

$$\begin{aligned}r_{up,m} &= H_{up}x_{up,m} + n_{up} \\ &= H_{up}\hat{K}_{ut}\hat{v}_{ut,m}p_m + n_{up} \\ &\approx \hat{H}_{cup}\hat{v}_{ut,m}p_m + n_{up} \\ &= \hat{U}_{ap}\hat{\Sigma}\hat{V}_{ut}^H\hat{v}_{ut,m}p_m + n_{up} \\ &= \hat{u}_{ap,m}\hat{\sigma}_m p_m + n_{up},\end{aligned} \quad \text{Eq (7)}$$

where $r_{up,m}$ is a received vector for the uplink steered reference for eigenmode m;

$\hat{\sigma}_m$ is the m-th diagonal element of $\hat{\Sigma}$; and $\hat{u}_{ap,m}$ is the m-th eigenvector or column of $\hat{U}_{ap}$, where $\hat{U}_{ap} = [\hat{u}_{ap,1} \; \hat{u}_{ap,2} \; \ldots \; \hat{u}_{ap,N_{ap}}]$.

Equation (7) shows that the received uplink steered reference at the access point, in the absence of noise, is approximately equal to $\hat{u}_{ap,m}\hat{\sigma}_m p_m$. The access point can obtain an estimate of the uplink channel response based on the steered reference sent by the user terminal using various estimation techniques.

In one embodiment, to obtain an estimate of $\hat{u}_{ap,m}$, the received vector $r_{up,m}$ is first multiplied with the complex conjugate of the pilot symbol, or $p_m^*$, and then integrated over multiple received steered reference symbols for each eigenmode to obtain a vector $\bar{r}_{up,m}$, which is an estimate of $\hat{u}_{ap,m}\hat{\sigma}_m$ for eigenmode m. Since the eigenvectors have unit power, the singular value $\hat{\sigma}_m$ for each eigenmode may be estimated based on the received power of the uplink steered reference for that eigenmode, which is $\hat{\sigma}_m = \|\bar{r}_{up,m}\|^2$). Each of the $N_{ap}$ elements of the estimate of $\hat{u}_{ap,m}$ is obtained by dividing a corresponding one of the $N_{ap}$ elements of $\bar{r}_{up,m}$ by $\hat{\sigma}_m$.

In another embodiment, an estimate of $\hat{u}_{ap,m}$ is obtained based on the received vector $r_{up,m}$ and using an MMSE technique. Since the pilot symbols $p_m$ are known, the access point can derive the estimate of $\hat{u}_{ap,m}$ such that the mean square error between a received pilot symbol $\hat{p}_m$ (which is obtained after performing the matched filtering on the received vector $r_{up,m}$ with $\hat{v}_{ut,m}$) and the transmitted pilot symbol $p_m$ is minimized.

The access point may perform additional processing on the estimates of $\hat{u}_{ap,m}$, for m=1 ... $N_S$. For example, since these estimates are obtained for one eigenvector at a time, the $N_S$ eigenvector estimates may not be orthogonal to one another due to, for example, noise in the received steered reference, changes in the MIMO channel response, and so on. The access point may then perform Gram-Schmidt orthogonalization on the $N_S$ eigenvector estimates to obtain orthogonal transmit vectors. In any case, the access point obtains a transmit matrix $\hat{\hat{U}}_{ap}$, which is an estimate of $\hat{U}_{ap}$, which in turn is derived by the user terminal based on $\hat{H}_{cdn}$. The access point uses the transmit matrix $\hat{U}_{ap}$ to perform spatial processing for downlink transmission.

1. Follow-on Calibration

The correction matrices $\hat{K}_{ap}$ and $\hat{K}_{ut}$ obtained from the initial calibration may contain errors due to various sources such as (1) imperfect channel estimates $\hat{H}_{dn}$ and $\hat{H}_{up}$ used for the initial calibration, (2) changes in the transmit/receive chains at the access point and user terminal, and so on. Errors in the correction matrices cause errors in both (1) the transmit matrix $\hat{V}_{ut}$ used by the user terminal for spatial processing and derived from $\hat{H}_{cdn}$ and (2) the transmit matrix $\hat{\hat{U}}_{ap}$ used by the access point for spatial processing and derived from the uplink steered reference sent using $\hat{u}_{ut}$. Improved performance may be obtained if the errors in the correction matrices can be estimated and removed.

The access point and/or the user terminal can perform follow-on calibration to estimate the errors in the correction matrices $\hat{K}_{ap}$ and $\hat{K}_{ut}$. For clarity, the following description is for follow-on calibration by the user terminal. For follow-on calibration by the user terminal, the access point transmits a MIMO pilot on the downlink using the correction matrix $\hat{K}_{ap}$ and also transmits a steered reference on the downlink using the transmit matrix $\hat{U}_{ap}$ and the correction matrix $\hat{K}_{ap}$. The downlink steered reference may be expressed as:

$$x_{dn,m} = \hat{K}_{ap}\hat{u}_{ap,m}p_m, \text{ where } \hat{U}_{ap} = [\hat{u}_{ap,1} \; \hat{u}_{ap,2} \; \ldots \; \hat{u}_{ap,N_{ap}}].$$

The user terminal can obtain an estimate of $V_{ut}\Sigma^T$ based on the received downlink steered reference, similar to that described above for the uplink steered reference. For simplicity, the estimate of $V_{ut}\Sigma^T$ derived from the downlink steered reference is called an "actual received" transmit matrix $\tilde{V}_a$, which is an unnormalized matrix that includes an estimate of $V_{ut}$ as well as an estimate of $\Sigma$. (For clarity, the "~" above a matrix indicates that it is an unnormalized matrix.) The user terminal also obtains another version of $\hat{H}_{cdn}$ from the MIMO pilot sent by the access point.

The errors in the correction matrices $\hat{K}_{ap}$ and $\hat{K}_{ut}$ may be represented by diagonal calibration error matrices $Q'_{ap}$ and $Q'_{ut}$, respectively. The correction matrices $\hat{K}_{ap}$ and $\hat{K}_{ut}$ may then be expressed as:

$$\hat{K}_{ap}=K_{ap}Q'_{ap} \text{ and } \hat{K}_{ut}=K_{ut}Q'_{ut}. \quad \text{Eq (8)}$$

If the errors in the correction matrices are small, then the diagonal elements of $Q'_{ap}$ and $Q'_{ut}$ are complex values close to 1+j0. The calibrated downlink channel response estimate, $\hat{H}_{cdn}$, may then be expressed as:

$$\hat{H}_{cdn}=\hat{H}_{dn}\hat{K}_{ap}=\hat{H}_{dn}K_{ap}Q'_{ap}, \quad \text{Eq (9)}$$

or $\hat{H}_{cdn}Q'_{ap}{}^{-1}=\hat{H}_{dn}K_{ap}$.

The matrices $Q'_{ap}$ and $Q'_{ut}$ contain the "true" errors in $\hat{K}_{ap}$ and $\hat{K}_{ut}$, respectively. A guess or estimate of $Q'_{ap}$ and $Q'_{ut}$ may be denoted as $Q_{ap}$ and $Q_{ut}$, respectively. A "hypothesized" downlink channel may be defined as:

$$H_{hyp}=\hat{H}_{cdn}Q_{ap}^{-1}. \quad \text{Eq (10)}$$

A hypothesized downlink channel is a guess of $\hat{H}_{dn}K_{ap}$ and is derived under the assumption that the error in the applied correct correction matrix $\hat{K}_{ap}$ is $Q_{ap}$. If $Q_{ap}$ is a perfect guess of $Q'_{ap}$ in equation (10) and $\hat{H}_{dn}$ is a perfect estimate of $H_{dn}$, in equation (9), then $H_{hyp}=H_{cdn}$ and $H_{hyp}{}^T=H_{cup}$.

The spatial processing at the access point may be expressed as:

$$\hat{U}_{ap}\hat{\Sigma}=\hat{H}_{cup}\hat{V}_{ut}=\hat{H}_{up}\hat{K}_{ut}\hat{V}_{ut}=\hat{H}_{up}K_{ut}Q'_{ut}\hat{V}_{ut}, \quad \text{Eq (11)}$$

where $\hat{V}_{ut}$ is obtained from the singular value decomposition of $\hat{H}_{cdn}$, which is obtained from the downlink MIMO pilot. The user terminal does not have the value for $Q'_{ap}$, but only its guess $Q_{ap}$. The user terminal thus computes an unnormalized transmit matrix $\tilde{U}_{rx}$ that hypothetically would have been obtained by the access point if the calibration error matrices were $Q_{ap}$ and $Q_{ut}$, as follows:

$$\tilde{U}_{rx}=H_{hyp}{}^T Q_{ut}\hat{V}_{ut}=(\hat{H}_{cdn}Q_{ap}{}^{-1})^T Q_{ut}\hat{V}_{ut}. \quad \text{Eq (12)}$$

Equation (12) is equal to equation (11) if $Q_{ap}$ is a perfect guess of $Q'_{ap}$ and $Q_{ut}$ is a perfect guess of $Q'_{ut}$. If this is the case, then $H_{hyp}=\hat{H}_{dn}K_{ap}$.

The user terminal then performs processing on $\tilde{U}_{rx}$ in the same manner that the access point would have performed on a received uplink steered reference and obtains a "generated" transmit matrix $U_g$, which is a normalized transmit matrix that resembles $\hat{U}_{ap}$. For example, the access point may perform Gram-Schmidt orthogonalization of the received eigenvectors $\hat{u}_{ap,m}$ in order to improve the performance of its transmit steering vectors. In this case, the user terminal would perform the same orthogonalization on the eigenvectors in $\tilde{U}_{rx}$. The user terminal simply emulates the processing that is normally performed by both the access point and the user terminal, albeit under an assumption of calibration errors represented by $Q_{ap}$ and $Q_{ut}$. The matrix $U_g$ would have been used by the access point to transmit the downlink steered reference and for spatial processing of downlink transmission.

The spatial processing at the user terminal may be expressed as:

$$V_g \Sigma_g^T = \hat{H}_{cdn} U_g = \hat{H}_{dn} \hat{K}_{ap} U_g = \hat{H}_{dn} K_{ap} Q'_{ap} U_g. \quad \text{Eq (13)}$$

Again, the user terminal does not have $Q'_{ap}$, but only its guess $Q_{ap}$. The user terminal thus computes a hypothesized transmit matrix $\tilde{V}_{hyp}$ for itself as follows:

$$\tilde{V}_{hyp} = H_{hyp} Q_{ap} U_g. \quad \text{Eq (14)}$$

Equation (14) is equal to equation (13) if $H_{hyp}$ is a perfect guess of $\hat{H}_{dn} K_{ap}$ and $Q_{ap}$ is a perfect guess of $Q'_{ap}$. The matrix $\tilde{V}_{hyp}$ is an unnormalized matrix that includes a user terminal transmit matrix $V_g$ (which corresponds to the access point transmit matrix $U_g$) as well as a diagonal matrix $\Sigma_g$ (which resembles $\Sigma$). The matrix $\tilde{V}_{hyp}$ is hypothesized to have been received by the user terminal with (1) the user terminal transmitting an uplink steered reference using $\hat{V}_{ut}$, (2) the access point performing its normal processing on the received uplink steered reference to derive its transmit matrix $U_g$, (3) the access point transmitting a downlink steered reference using $U_g$, (4) the correction matrices $\hat{K}_{ap}$ and $\hat{K}_{ut}$ having the errors indicated by the matrices $Q_{ap}$ and $Q_{ut}$, respectively, and (5) assuming no channel estimation error in $\hat{H}_{cdn}$ from the downlink MIMO pilot.

Equations (12) and (14) are correct if the calibration error matrices $Q_{ap}$ and $Q_{ut}$ correctly indicate the true errors in the correction matrices $\hat{K}_{ap}$ and $\hat{K}_{ut}$, respectively. The difference between the actual received transmit matrix $\tilde{V}_a$ obtained from the downlink steered reference and the hypothesized transmit matrix $\tilde{V}_{hyp}$ obtained from the downlink MIMO pilot may be computed as follows:

$$E = \tilde{V}_a - \tilde{V}_{hyp}, \quad \text{Eq (15)}$$

where E is an $N_{ut} \times N_{ap}$ matrix of errors between $\tilde{V}_a$ and $\tilde{V}_{hyp}$. The error matrix E gives an indication of the accuracy of the guess for $Q_{ap}$ and $Q_{ut}$. Various adaptive procedures may be used to adjust the matrices $Q_{ap}$ and $Q_{ut}$ to drive the error matrix E toward zero. Such adaptive procedures include an MMSE adaptive procedure and a steepest descent adaptive procedure. The diagonal elements of $Q_{ap}$ and $Q_{ut}$ may be initialized to $1+j0$ for the adaptive procedures.

For the MMSE adaptive procedure, approximate partial derivatives of the elements of E are computed with respect to the elements of $Q_{ap}$ and $Q_{ut}$. If the "lead" element (which is the upper leftmost element) of $\hat{K}_{ap}$ is set to $1+j0$ by the initial calibration, then this element does not need to be adjusted. In addition, the error matrix E is not affected by the magnitude of the elements in $Q_{ut}$. Thus, $Q_{ut}$ may be normalized, for example, by defining the real component of the lead element of $Q_{ut}$ to be 1.0. Furthermore, an eigenvector may be scaled by any unit-magnitude complex number (or rotated by any phase) without affecting its performance. Thus, a set of phases may be selected to make $\tilde{V}_{hyp}$ close to $\tilde{V}_a$ without any loss in generality. This property allows for scaling of $Q_{ut}$ by an arbitrary unit-magnitude factor, so the imaginary component of the lead element of $Q_{ut}$ may be defined to be 0.0.

The MMSE adaptive procedure may be performed as follows. Let q be a real vector of length $2(N_{ap}+N_{ut}-2)$ and made up of the real and imaginary components of the diagonal elements of $Q_{ap}$ and $Q_{ut}$, except for the lead elements which are set to 1.0. The vector q may be defined as:

$$q_{2(i-2)+1} = Re\{Q_{ap}(i,i)\}, \text{ for } i=2 \ldots N_{ap},$$

$$q_{2(i-1)} = Im\{Q_{ap}(i,i)\}, \text{ for } i=2 \ldots N_{ap},$$

$$q_{2(i+N_{ap}-2)+1} = Re\{Q_{ut}(i,i)\}, \text{ for } i=2 \ldots N_{ut}, \text{ and}$$

$$q_{2(i-N_{ap}-2)} = Im\{Q_{ut}(i,i)\}, \text{ for } i=2 \ldots N_{ut},$$

where $q_i$ is the i-th element of q;
$Q_{ap}(i,i)$ is the i-th diagonal element of $Q_{ap}$; and
$Q_{ut}(i,i)$ is the i-th diagonal element of $Q_{ut}$.

The odd-indexed elements of q are for the real component of the diagonal elements of $Q_{ap}$ and $Q_{ut}$, and the even-indexed elements of q are for the imaginary component of the diagonal elements of $Q_{ap}$ and $Q_{ut}$. The first $2N_{ap}-2$ elements of q are for the $N_{ap}-1$ diagonal elements other than the lead element of $Q_{ap}$, and the last $2N_{ut}-2$ elements of q are for the $N_{ut}-1$ diagonal elements other than the lead element of $Q_{ut}$.

Let e be a real vector of length $2N_{ap}N_{ut}$ and made up of the real and imaginary components of the elements of E. The vector e may be defined as:

$$e_{2(i+(j-1)N_{ut})-1} = Re\{E(i,j)\}, \text{ for } i=1 \ldots N_{ut} \text{ and } j=1 \ldots N_{ap}, \text{ and}$$

$$e_{2(i+(j-1)N_{ut})} = Im\{E(i,j)\}, \text{ for } i=1 \ldots N_{ut} \text{ and } j=1 \ldots N_{ap},$$

where $e_i$ is the i-th element of e; and
$E(i,j)$ is the element in the i-th row and j-th column of E.

The odd-indexed elements of e are for the real component of the elements of E, and the even-indexed elements of e are for the imaginary component of the elements of E. The error vector e can be obtained by evaluating equations (10), (12), (14), and (15) with the vector q.

For the MMSE adaptive procedure, the partial derivative of a real or imaginary component of an element in E with respect to a real or imaginary component of an element in $Q_{ap}$ or $Q_{ut}$ may be generated by perturbing the component of the element in $Q_{ap}$ or $Q_{ut}$ and computing the function defined by equations (10), (12), (14), and (15). As part of the computation for $\tilde{V}_{hyp}$, a single $e^{jx}$ term may be selected such that $|\tilde{V}_a - e^{jx} \cdot \tilde{V}_{hyp}|^2$ is minimized. This is done to normalize the phase of the lead element of $Q_{ut}$.

Approximate partial derivatives of the elements of e with respect to the elements of q may be expressed as:

$$A_{j,i} = \frac{\partial e_j}{\partial q_i} \cong \frac{e_j(q + \Delta_i) - e_j(q)}{\delta}, \quad \text{Eq (16)}$$

for $i = 1 \ldots 2(N_{ap} + N_{ut} - 2)$ and $j = 1 \ldots 2N_{ap}N_{ut}$ where $\Delta_j$ is a vector of length $2(N_{ap}+N_{ut}-2)$ and containing a small real value of $\delta$ for the j-th element and zeros elsewhere; and $A_{j,i}$ is the approximate partial derivative of the j-th element of e with respect to the i-th element of q.

The approximate partial derivative $A_{j,i}$ may be obtained as follows. A vector $q_i$ is first computed as $q_i = q + \Delta_i$. The function defined by equations (10), (12), and (14) is then evaluated for $q_i$ (which contains $Q_{ap,i}$ and $Q_{ut,i}$) to obtain a new (or "revised") hypothesized transmit matrix $\tilde{V}_{hyp,i}$. $\tilde{V}_{hyp,i}$ is then subtracted from $\tilde{V}_a$ to obtain a new error matrix $E_i = \tilde{V}_a - \tilde{V}_{hyp,i}$, which is used to form a new error vector $e_i$. The j-th element of e, which is denoted as $e_j(q)$ in equation (16), is then subtracted from the j-th element of $e_i$, which is denoted as $e_j(q+\Delta_i)$ in equation (16). The result of the subtraction is divided by $\delta$ to obtain $A_{j,i}$.

The computation for equations (10), (12), (14), and (15) is performed for each of the $2(N_{ap}+N_{ut}-2)$ elements of q to obtain a corresponding new error vector $e_i$. For each new error vector $e_i$, the $2N_{ap}N_{ut}$ elements of e are subtracted from the $2N_{ap}N_{ut}$ elements of $e_i$, on an element-by-element basis, to obtain $2N_{ap}N_{ut}$ approximate partial derivatives of the $2N_{ap}N_{ut}$ elements of e with respect to the i-th element of q. A matrix A of dimension $2N_{ap}N_{ut}$ by $2(N_{ap}+N_{ut}-2)$ may be formed with all of the partial derivatives for all of the elements of e and q. Each column of A contains $2N_{ap}N_{ut}$ approximate partial derivatives for the $2N_{ap}N_{ut}$ elements of e with respect to one element of q. The $2(N_{ap}+N_{ut}-2)$ columns of A are for the $2(N_{ap}+N_{ut}-2)$ elements q.

If the relationships in equations (10), (12), (14), and (15) are approximately linear, then an estimate of the difference between the guess of the calibration errors in q and the actual calibration errors may be expressed as:

$$y = A^{-1}e, \quad \text{Eq (17)}$$

where y is an update vector for the estimated difference between q and the actual calibration errors. The update vector y has the same format and dimension as the vector q, which is a real vector made up of the real and imaginary components of the diagonal elements of $Q_{ap}$ and $Q_{ut}$ other than the lead elements.

If A is not a square matrix, which is typically the case, then the simple matrix inverse does not exist. The Moore-Penrose pseudo-inverse of A may then be used for equation (17). This pseudo-inverse is simply a matrix that satisfies the equations $AA^{-1}A=A$ and $A^{-1}AA^{-1}=A^{-1}$. The pseudo-inverse may be generated by performing singular value decomposition of A, which is $A=U_\alpha D V_\alpha^H$, and computing the pseudo-inverse as $A^{-1}=U_\alpha^H D^{-1} V_\alpha$, where $D^{-1}$ is a diagonal matrix made up of the inverses of the corresponding non-zero diagonal elements of D.

The matrix A of partial derivatives is computed under an assumption that the function defined by equations (10) through (13) is approximately linear for calibration errors of the size being evaluated. Since the linearity assumption is not completely accurate, the procedure may be iterated multiple times to determine the correct calibration errors. For some cases, the procedure does not converge. However, convergence can generally be achieved by simply selecting a different initial guess for the calibration errors. If convergence is not obtained, the user terminal can also obtain another version of $\tilde{V}_a$ and $\hat{H}_{cdn}$ based on another estimate of the downlink steered reference and downlink MIMO pilot and perform the MMSE adaptive procedure using these new matrices.

If equations (10), (12), (14), and (15) are linear, then y+q would minimize the mean square of the elements of e. However, since these equations are not linear, q is replaced with y+q and the procedure is repeated. The calibration error vector may then be updated as follows:

$$q_{mmse}(n+1) = y(n) + q_{mmse}(n), \quad \text{Eq (18)}$$

where n is an index for the iteration number;
$q_{mmse}(n)$ is the calibration error vector for the n-th iteration;
y(n) is the update vector obtained for the n-th iteration; and
$q_{mmse}(n+1)$ is the calibration error vector for the (n+1)-th iteration.

The computation described above may be repeated for any number of iterations. Each iteration uses the updated calibration error vector $q_{mmse}(n+1)$ obtained from the prior iteration. The procedure can terminate when the update vector y(n) is sufficiently small. For example, the termination condition may be $\|y(n)\|^2 = y < y_{th1}$, where y is the sum of the squares of the magnitude of the elements of y(n) and $y_{th1}$ is a threshold value. As another example, the termination condition may be $y_i < y_{th2}$, for all i, where $y_i$ is the i-th element of y(n) and $y_{th2}$ is another threshold value. After all iterations have been completed, the matrices for the final estimates of calibration errors are denoted as $Q_{ap,final}$ and $Q_{ut,final}$.

For the steepest descent adaptive procedure, an aggregate error may be defined as:

$$z = \|E\|^2 = \|\tilde{V}_a - \tilde{V}_{hyp}\|^2.$$

The aggregate error, z, is obtained by summing the squares of the magnitude of the elements of E. The partial derivatives of z with respect to the elements of q may be computed as follows:

$$g_i = \frac{\partial z}{\partial q_i} \cong \frac{z(q + \Delta_i) - z(q)}{\delta}, \quad \text{Eq (20)}$$

for $i = 1 \ldots 2(N_{ap} + N_{ut} - 2)$, where $g_i$ is the approximate partial derivative of z with respect to the i-th element of q and $\Delta_i$ is a vector of length $2(N_{ap}+N_{ut}-2)$ and containing a small real value of $\delta$ for the i-th element and zeros elsewhere. The approximate partial derivative $g_i$ may be obtained as follows. A vector $q_i$ is first computed as $q_i = q + \Delta_i$. The function defined by equations (10), (12), (14), and (15) is evaluated for $q_i$ to obtain a new error vector $e_i$. The aggregate error $z_i$ is then computed for the new error vector $e_i$, as shown in equation (19). The aggregate error z obtained with q, which is denoted as z(q) in equation (20), is then subtracted from the aggregate error $z_i$ obtained with $q_i$, which is denoted as $z(q+\Delta_i)$ in equation (20). The result of the subtraction is divided by $\delta$ to obtain $g_i$. The computation is repeated for each of the $2(N_{ap}+N_{ut}-2)$ elements of q. A vector g of dimension $2(N_{ap}+N_{ut}-2)$ may be formed with the approximate partial derivates obtained for the $2(N_{ap}+N_{ut}-2)$ elements of q. Each element of g is the slope of the aggregate error evaluated at a corresponding element of q.

The calibration error vector may then be updated as follows:

$$q_{sd}(n+1) = q_{sd}(n) - \delta g(n), \quad \text{Eq (21)}$$

where g(n) is the slope vector obtained for the n-th iteration, and $q_{sd}(n)$ and $q_{sd}(n+1)$ are the calibration error vectors for the n-th and (n+1)-th iterations, respectively, for the steepest descent procedure. The computation described above may be repeated for any number of iterations. Each iteration uses the updated calibration error vector $q_{sd}(n+1)$ obtained from the prior iteration. The procedure can terminate when the aggregate error z is sufficiently small, e.g., less then a $z_{th}$ threshold value.

Two adaptive procedures have been described above for deriving estimates of the actual calibration errors. Other adaptive and non-adaptive procedures may also be used, and this is within the scope of the invention.

The user terminal can update its correction matrix to account for the calibration errors, as follows:

$$\hat{K}_{ut,new} = \hat{K}_{ut} Q_{ut,final}^{-1}. \quad \text{Eq (22)}$$

The user terminal uses the new correction matrix $\hat{K}_{ut,new}$, instead of the prior correction matrix $\hat{K}_{ut}$, for spatial processing for uplink transmission, as shown in FIG. 2. The user terminal may send the calibration error matrix $Q_{ap,final}$ to the access point, which may then update its correction matrix as $\hat{K}_{ap,new} = \hat{K}_{ap} Q_{ap,final}^{-1}$. To reduce the amount of signaling, the user terminal may only send back the calibration error matrix $Q_{ap,final}$ if the matrix meets some predetermined threshold.

Figure 3:
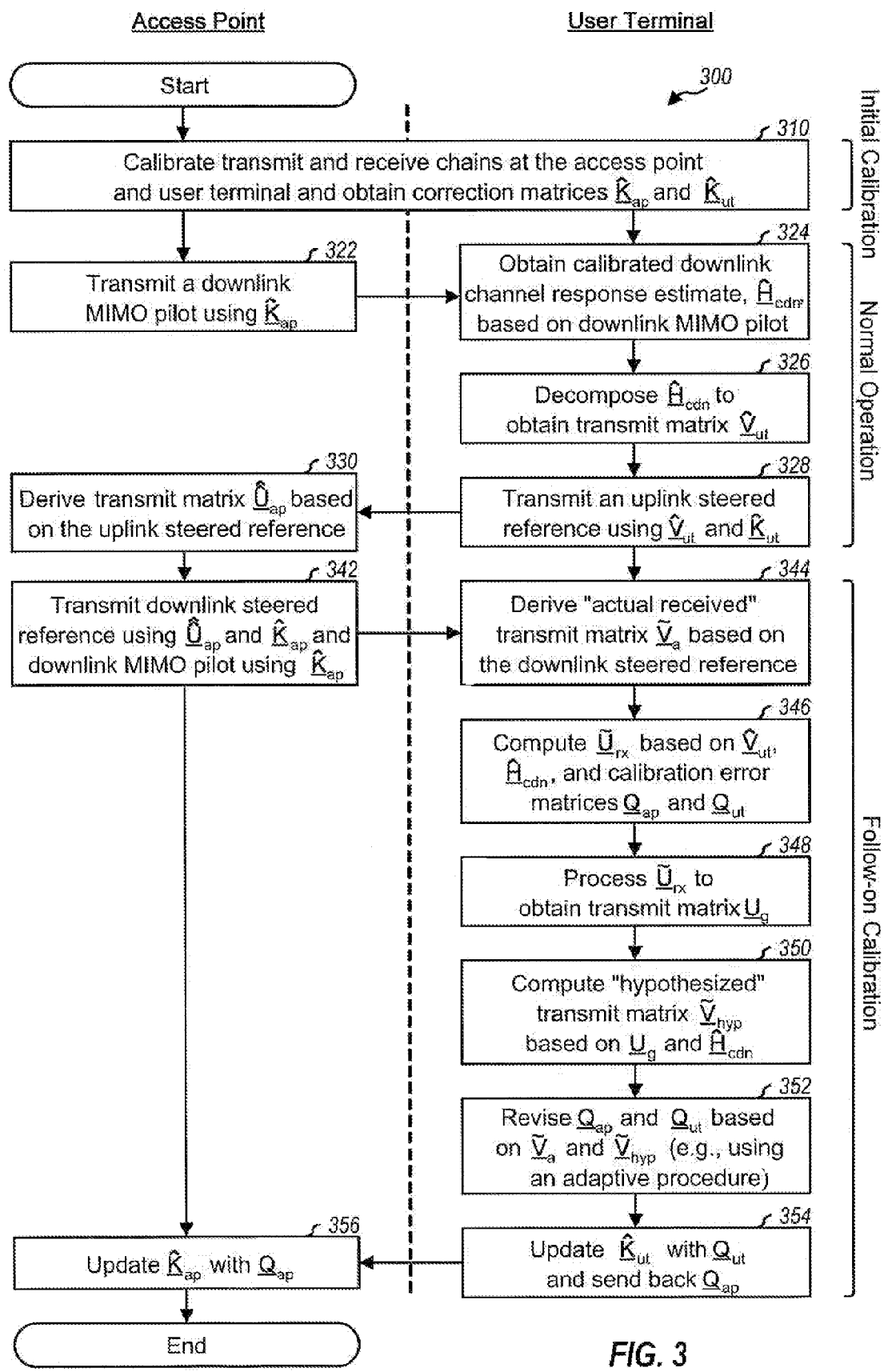
FIG. 3 shows a process performed by the access point and user terminal for initial calibration, normal operation, and follow-on calibration.

FIG. 3 shows a process 300 performed by the access point and user terminal for initial calibration, normal operation, and follow-on calibration. The access point and user terminal perform initial calibration to calibrate their transmit and receive chains and derive correction matrices $\hat{K}_{ap}$ and $\hat{K}_{ut}$ (block 310). The initial calibration is described below.

Thereafter, for normal operation, the access point transmits a downlink MIMO pilot using its correction matrix $\hat{K}_{ap}$ (block 322). The user terminal obtains a calibrated downlink channel response estimate, $\hat{H}_{cdn}$, based on the downlink MIMO pilot (block 324) and performs singular value decomposition of $\hat{H}_{cdn}$ to obtain its transmit matrix $\hat{V}_{ut}$ (block 326). The user terminal then transmits an uplink steered reference using $\hat{V}_{ut}$ and $\hat{K}_{ut}$, as shown in equation (6) (block 328). The access point receives the uplink steered reference and derives its transmit matrix $$\hat{U}_{ap},$$

as described above (block 330). The access point and user terminal use the transmit matrices $$\hat{U}_{ap}$$

and $\hat{V}_{ut}$, respectively, for spatial processing.

For the follow-on calibration, the access point transmits a downlink steered reference using $$\hat{U}_{ap}$$

and $\hat{K}_{ap}$, and further transmits a downlink MIMO pilot using $\hat{K}_{ap}$ (block 342). The user terminal derives the actual unnormalized transmit matrix $\tilde{V}_a$ based on the downlink steered reference, as described above (block 344). The user terminal also computes the unnormalized transmit matrix $\tilde{U}_{rx}$ based on its transmit matrix $\hat{V}_{ut}$, the calibrated downlink channel response estimate $\hat{H}_{cdn}$, and the calibration error matrices $Q_{ap}$ and $Q_{ut}$, as shown in equations (10) and (12), or $\tilde{U}_{rx} = (\hat{H}_{cdn} Q_{ap}^{-1})^T Q_{ut} \hat{V}_{ut}$ (block 346). The user terminal further processes $\tilde{U}_{rx}$ in the same manner as would have been performed by the access point (e.g., perform orthogonalization) to obtain the normalized transmit matrix $U_g$ (block 348). The user terminal then computes the hypothesized unnormalized transmit matrix $\tilde{V}_{hyp}$ based on the transmit matrix $U_g$ and the calibrated downlink channel response estimate $\hat{H}_{cdn}$, as shown in equations (10) and (14), which is $\tilde{V}_{hyp} = \hat{H}_{cdn} U_g$ (block 350). The matrix $\tilde{V}_{hyp}$ is the unnormalized transmit matrix that the user terminal would have received if the access point transmits a downlink steered reference using $U_g$. The user terminal then revises the calibration error matrices $Q_{ap}$ and $Q_{ut}$ based on the transmit matrices $\tilde{V}_a$ and $\tilde{V}_{hyp}$ (block 352). Blocks 346 through 352 may be performed using an adaptive procedure. The user terminal may thereafter update its correction matrix $\hat{K}_{ut}$ with the calibration error matrix $Q_{ut}$ (block 354), and the access point may thereafter update its correction matrix $\hat{K}_{ap}$ with the calibration error matrix $Q_{ap}$ (block 356).

Figure 4:
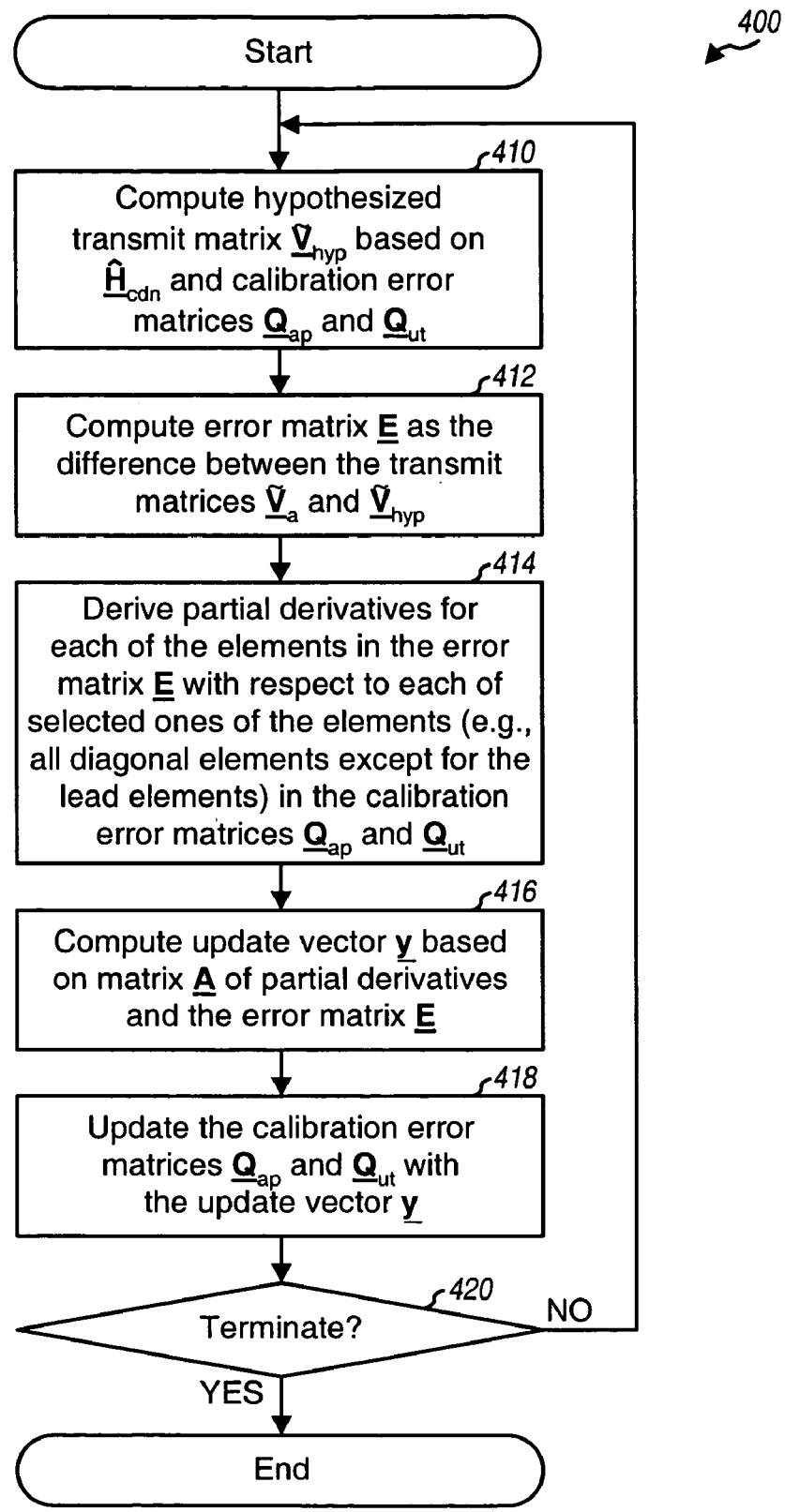
FIG. 4 shows a minimum mean square error (MMSE) adaptive procedure.

FIG. 4 shows an MMSE adaptive procedure 400, which may be used for blocks 346 through 352 in FIG. 3. The hypothesized transmit matrix $\tilde{V}_{hyp}$ is first computed based on $\hat{H}_{cdn}$ and $Q_{ap}$ and $Q_{ut}$ (block 410). Block 410 corresponds to blocks 346 through 350 in FIG. 3. The error matrix E is next computed as the difference between the transmit matrices $\tilde{V}_a$ and $\tilde{V}_{hyp}$, as shown in equation (15) (block 412). Partial derivatives for each of the elements in the error matrix E with respect to each of selected ones of the elements (e.g., all diagonal elements except for the lead elements) in the calibration error matrices $Q_{ap}$ and $Q_{ut}$ are then derived, as shown in equation (16) (block 414). The matrix E and the matrices $Q_{ap}$ and $Q_{ut}$ may be placed in the form of vectors for ease of computation, as described above. The partial derivatives may be derived separately for the real and imaginary components of the elements in the matrices, as also described above. The update vector y is then computed based on the matrix A of partial derivatives and the error matrix E, as shown in equation (17) (block 416). The calibration error matrices $Q_{ap}$ and $Q_{ut}$ are then updated with the update vector y, as shown in equation (18) (block 418). A determination is next made whether or not the update vector y satisfies a termination condition (block 420). If the answer is 'yes', then process 400 terminates. Otherwise, the process returns to block 410 and performs another iteration.

Figure 5:
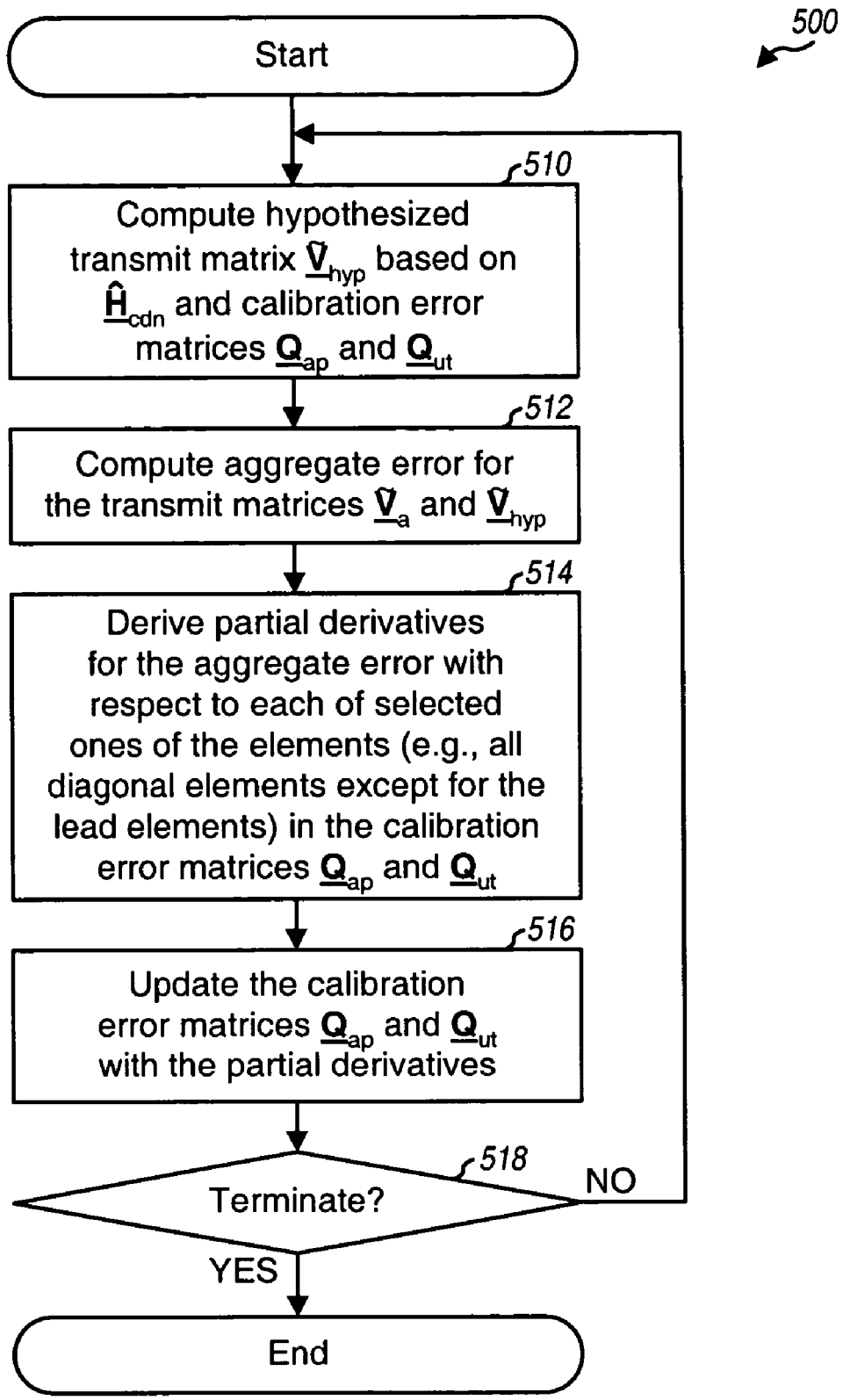
FIG. 5 shows a steepest descent adaptive procedure.

FIG. 5 shows a steepest descent adaptive procedure 500, which may also be used for blocks 346 through 352 in FIG. 3. The hypothesized transmit matrix $\tilde{V}_{hyp}$ is first computed based on $\hat{H}_{cdn}$ and $Q_{ap}$ and $Q_{ut}$ (block 510). The aggregate error z is next computed as $z = \|\tilde{V}_a - \tilde{V}_{hyp}\|^2$, as shown in equation (19) (block 512). Partial derivatives for the aggregate error with respect to each of selected ones of the elements in the calibration error matrices $Q_{ap}$ and $Q_{ut}$ are then derived, as shown in equation (20) (block 514). The matrices $Q_{ap}$ and $Q_{ut}$ may be placed in the form of a vector, and the partial derivatives may be derived separately for the real and imaginary components of the elements in the matrices. The calibration error matrices $Q_{ap}$ and $Q_{ut}$ are then updated with the partial derivatives, as shown in equation (21) (block 516). A determination is next made whether or not the aggregate error z satisfies a termination condition (block 518). If the answer is 'yes', then process 500 terminates. Otherwise, the process returns to block 510 and performs another iteration.

In the above description, the user terminal estimates the calibration errors in both the correction matrices $\hat{K}_{ap}$ and $\hat{K}_{ut}$. To simplify the follow-on calibration, the user terminal can assume that the correction matrix $\hat{K}_{ap}$ contains no errors and only estimate the errors in the correction matrix $\hat{K}_{ut}$. This is equivalent to setting the calibration error matrix $Q_{ap}$ to the identity matrix. By omitting $Q_{ap}$, the dimensions of the vectors q, y, and g and the matrix A are reduced, which may then greatly reduce the computation.

For clarity, the description above is for the case in which the user terminal performs follow-on calibration. The access point may also perform the follow-on calibration. In this case, the access point and user terminal switches role in FIG. 3. The user terminal would then transmit an uplink steered reference and an uplink MIMO pilot, and the access point would perform the computation to derive $Q_{ap}$ and $Q_{ut}$.

Also for clarity, the follow-on calibration is described for a single-carrier MIMO system. The follow-on calibration may also be performed for a multi-carrier MIMO system, which may utilize orthogonal frequency division multiplexing (OFDM) or some other multi-carrier modulation technique. OFDM effectively partitions the overall system bandwidth into multiple ($N_F$) orthogonal subbands, which are also called tones, subcarriers, bins, and frequency channels. With OFDM, each subband is associated with a respective subcarrier that may be modulated with data. For a MIMO system that utilizes OFDM (an MIMO-OFDM system), the computation described above may be performed for each of multiple subbands. Since a high degree of correlation may exist between nearby subbands, the calibration may be performed in a manner to take advantage of this correlation, for example, to reduce the number of subbands to perform follow-on calibration, to speed up convergence, and so on.

2. Initial Calibration

For the initial calibration to derive the correction matrices $\hat{K}_{ap}$ and $\hat{K}_{ut}$, one entity (either the user terminal or access point) obtains both the effective downlink channel response estimate, $\hat{H}_{dn}$, and the effective uplink channel response estimate, $\hat{H}_{up}$. The channel estimates $\hat{H}_{dn}$ and $\hat{H}_{up}$ may be obtained based on downlink and uplink MIMO pilots, respectively. The correction matrices may be computed from $\hat{H}_{dn}$ and $\hat{H}_{up}$ and using matrix-ratio computation or MMSE computation.

For the matrix-ratio computation, an $N_{ut} \times N_{ap}$ matrix C is first computed as:

$$\underline{C} = \frac{\hat{H}_{up}^T}{\hat{H}_{dn}}, \qquad \text{Eq (23)}$$

where the ratio is taken element-by-element.

The diagonal elements in the correction matrix $\hat{K}_{ap}$ for the access point are set equal to the mean of the normalized rows of C. Each row of C is first normalized by scaling each of the $N_{ap}$ elements in that row with the first element in the row. The mean of the normalized rows (denoted by a vector $\bar{c}_{row}$) is then computed as the sum of the $N_{ut}$ normalized rows divided by $N_{ut}$. The $N_{ap}$ diagonal elements of $\hat{K}_{ap}$ are then set equal to the $N_{ap}$ elements of $\bar{c}_{row}$. Because of the normalization, the lead element of $\hat{K}_{ap}$ is equal to unity.

The diagonal elements in the correction matrix $\hat{K}_{ut}$ for the user terminal are set equal to the mean of the inverses of the normalized columns of C. The j-th column of C, for $j=1 \ldots N_{ap}$, is first normalized by scaling each element in that column with the j-th diagonal element of $\hat{K}_{ap}$. The mean of the inverses of the normalized columns (denoted by a vector $\bar{c}_{col}$) is then computed by (1) taking the inverse of each normalized column, where the inversion is performed element-wise, (2) summing the $N_{ap}$ inverse normalized columns, and (3) dividing each element in the resultant column by $N_{ap}$ to obtain $\bar{c}_{col}$. The $N_{ut}$ diagonal elements of $\hat{K}_{ut}$ are set equal to the $N_{ut}$ elements of $\bar{c}_{col}$.

For the MMSE computation, the correction matrices $\hat{K}_{ap}$ and $\hat{K}_{ut}$ are derived from the effective downlink and uplink channel response estimates, $\hat{H}_{dn}$ and $\hat{H}_{up}$, such that the mean square error (MSE) between the calibrated downlink and uplink channel responses is minimized. This condition may be expressed as:

$$\min |(\hat{H}_{dn}\hat{K}_{ap})^T - \hat{H}_{up}\hat{K}_{ut}|^2, \qquad \text{Eq (24)}$$

which may also be written as:

$$\min |\hat{K}_{ap}\hat{H}_{dn}^T - \hat{H}_{up}\hat{K}_{ut}|^2,$$

where $\hat{K}_{ap}^T = \hat{K}_{ap}$ since $\hat{K}_{ap}$ is a diagonal matrix.

Equation (24) is subject to the constraint that the lead element of $\hat{K}_{ap}$ is set equal to unity. Without this constraint, the trivial solution would be obtained with all elements of the matrices $\hat{K}_{ap}$ and $\hat{K}_{ut}$ set equal to zero. In equation (24), a matrix Y is first obtained as $Y = \hat{K}_{ap}\hat{H}_{dn}^T - \hat{H}_{up}\hat{K}_{ut}$. The square of the absolute value is next obtained for each of the $N_{ap}N_{ut}$ elements of Y. The mean square error (or the square error since a divide by $N_{ap}N_{ut}$ is omitted) is then equal to the sum of all squared values.

The MMSE computation is performed as follows. For simplicity, the elements of $\hat{H}_{dn}$ are denoted as $\{a_{ij}\}$, the elements of $\hat{H}_{up}$ are denoted as $\{b_{ij}\}$, the diagonal elements of $\hat{K}_{ap}$ are denoted as $\{u_i\}$, and the diagonal elements of $\hat{K}_{ut}$ are denoted as $\{v_j\}$, where $i=1 \ldots N_{ap}$ and $j=1 \ldots N_{ut}$. The mean square error may be rewritten from equation (24), as follows:

$$MSE = \sum_{j=1}^{N_{ut}} \sum_{i=1}^{N_{ap}} |a_{ij}u_i - b_{ij}v_j|^2, \qquad \text{Eq (26)}$$

again subject to the constraint $u_1 = 1$. The minimum mean square error may be obtained by taking the partial derivatives of equation (25) with respect to u and v and setting the partial derivatives to zero. The results of these operations are the following equations:

$$\sum_{j=1}^{N_{ut}} (a_{ij}u_i - b_{ij}v_j) \cdot a_{ij}^* = 0, \text{ for } i = 2 \ldots N_{ap}, \text{ and} \qquad \text{Eq (26a)}$$

$$\sum_{i=1}^{N_{ap}} (a_{ij}u_i - b_{ij}v_j) \cdot b_{ij}^* = 0, \text{ for } j = 1 \ldots N_{ut}. \qquad \text{Eq (26b)}$$

In equation (26a), $u_1 = 1$ so there is no partial derivative for this case, and the index i runs from 2 through $N_{ap}$.

The set of $N_{ap} + N_{ut} - 1$ equations in equation sets (26a) and (26b) may be more conveniently expressed in matrix form, as follows:

$\underline{B}\underline{k} = \underline{z}$, where Eq (27)

$$B = \begin{bmatrix} \sum_{j=1}^{N_{ut}} |a_{2j}|^2 & 0 & \cdots & 0 & -b_{21}a_{21}^* & \cdots & -b_{2N_{ap}}a_{2N_{ut}}^* \\ 0 & \sum_{j=1}^{N_{ut}} |a_{3j}|^2 & 0 & \cdots & \cdots & \cdots & \cdots \\ \cdots & 0 & \cdots & 0 & & & \\ 0 & \cdots & 0 & \sum_{j=1}^{N_{ut}} |a_{N_{ap}j}|^2 & -b_{N_{ap}1}a_{N_{ap}1}^* & & -b_{N_{ap}N_{ut}}a_{N_{ap}N_{ut}}^* \\ -a_{21}b_{21}^* & \cdots & -a_{N_{ap}1}b_{N_{ap}1}^* & \sum_{i=1}^{N_{ap}} |b_{i1}|^2 & 0 & \cdots & 0 \\ \cdots & \cdots & & 0 & \sum_{i=1}^{N_{ap}} |b_{i2}|^2 & 0 & \cdots \\ & & & & 0 & \cdots & 0 \\ -a_{2N_{ut}}b_{2N_{ut}}^* & \cdots & -a_{N_{ap}N_{ut}}b_{N_{ap}N_{ut}}^* & 0 & \cdots & 0 & \sum_{i=1}^{N_{ap}} |b_{iN_{ut}}|^2 \end{bmatrix}$$

$$\underline{k} = \begin{bmatrix} u_2 \\ u_3 \\ \cdots \\ u_{N_{ap}} \\ v_1 \\ v_2 \\ \cdots \\ v_{N_{ut}} \end{bmatrix} \text{ and } \underline{z} = \begin{bmatrix} 0 \\ 0 \\ \cdots \\ 0 \\ a_{11}b_{11}^* \\ a_{12}b_{12}^* \\ \cdots \\ a_{1N_{ut}}b_{1N_{ut}}^* \end{bmatrix}.$$

The matrix B includes $N_{ap}+N_{ut}-1$ rows, with the first $N_{ap}-1$ rows corresponding to the $N_{ap}-1$ equations from equation set (26a) and the last $N_{ut}$ rows corresponding to the $N_{ut}$ equations from equation set (26b). The elements of the matrix B and the vector z may be obtained based on the elements of $\hat{H}_{dn}$ and $\hat{H}_{up}$. The diagonal elements of $\hat{K}_{ap}$ and $\hat{K}_{ut}$ are included in the vector k, which may be obtained as:

$$k = B^{-1}z. \quad \text{Eq (28)}$$

The results of the MMSE computation are correction matrices $\hat{K}_{ap}$ and $\hat{K}_{ut}$ that minimize the mean square error in the calibrated downlink and uplink channel responses, as shown in equation (24).

3. Spatial Processing

Table 2 summarizes the spatial processing performed by the user terminal and access point for data transmission and reception on the eigenmodes of the MIMO channel.

TABLE 2

| | Uplink | Downlink |
| --- | --- | --- |
| User Terminal | Transmit: $\underline{x}_{up} = \hat{K}_{ut}\hat{V}_{ut}\underline{s}_{up}$ | Receive: $\hat{\underline{s}}_{dn} = \hat{\Sigma}^{-1}\hat{V}_{ut}^T\underline{r}_{dn}$ |
| Access Point | Receive: $\hat{\underline{s}}_{up} = \hat{\Sigma}^{-1}\hat{U}_{ap}^H\underline{r}_{up}$ | Transmit: $\underline{x}_{dn} = \hat{K}_{ap}\hat{U}_{ap}^*\underline{s}_{dn}$ |

For the embodiment shown in FIG. 2 and Table 2, the correction matrices $\hat{K}_{ap}$ and $\hat{K}_{ut}$ are applied on the transmit side at the access point and user terminal, respectively.

4. System

Figure 6:
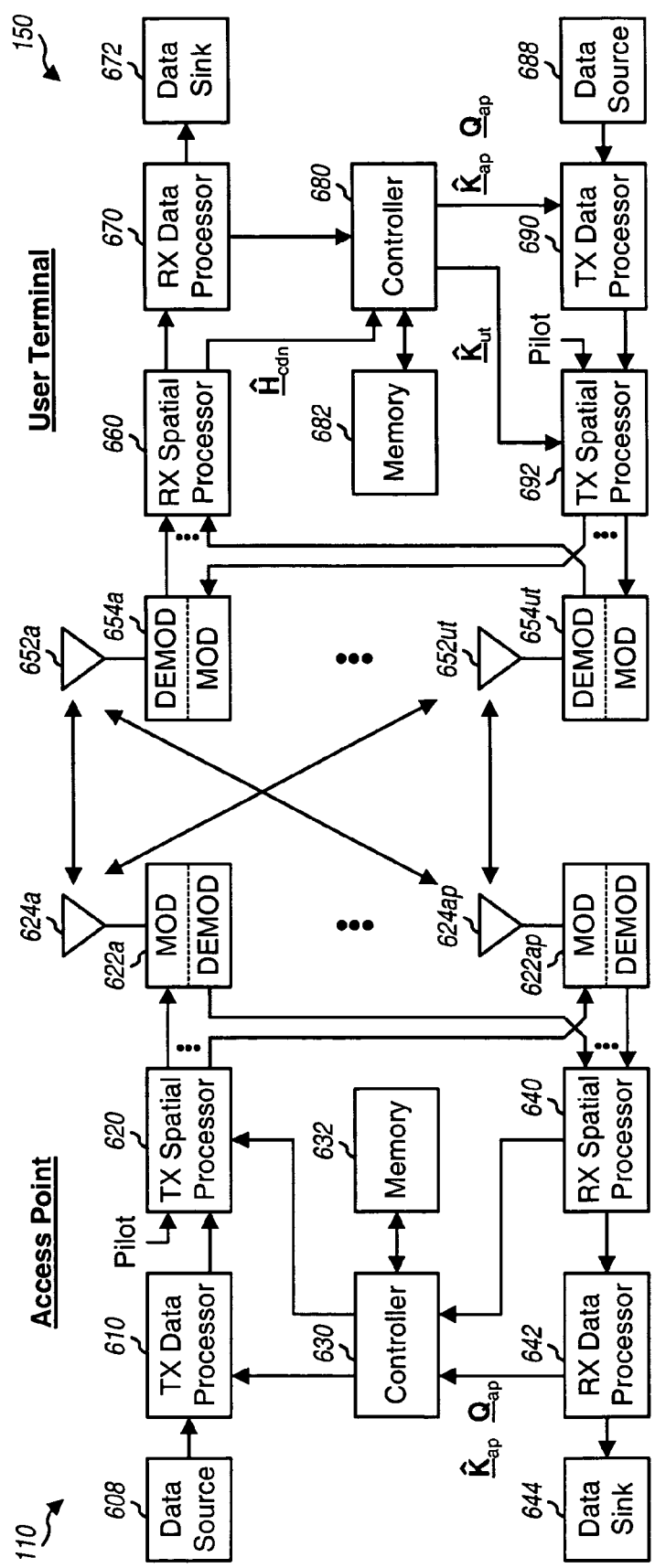
FIG. 6 shows a block diagram of the access point and user terminal.

FIG. 6 shows a block diagram of an embodiment of access point 110 and user terminal 150 in TDD MIMO system 100. On the downlink, at access point 110, a transmit (TX) data processor 610 receives traffic data (i.e., information bits) from a data source 608 and signaling and other data from a controller 630. TX data processor 610 formats, codes, interleaves, and modulates (or symbol maps) the different types of data and provides data symbols. As used herein, a "data symbol" is a modulation symbol for data, and a "pilot symbol" is a modulation symbol for pilot. The pilot symbols are known a priori by both the access point and user terminal. A TX spatial processor 620 receives the data symbols from TX data processor 610, performs spatial processing on the data symbols, multiplexes in pilot symbols as appropriate (e.g., for channel estimation, calibration, and so on), and provides $N_{ap}$ streams of transmit symbols to $N_{ap}$ modulators (MOD) 622a through 622ap. Each modulator 622 receives and processes a respective transmit symbol stream to obtain a corresponding stream of OFDM symbols, which is further processed by a transmit chain within the modulator to obtain a corresponding downlink modulated signal. $N_{ap}$ downlink modulated signals from modulator 622a through 622ap are then transmitted from $N_{ap}$ antennas 624a through 624ap, respectively.

At user terminal 150, $N_{ut}$ antennas 652a through 652ut receive the transmitted downlink modulated signals, and each antenna provides a received signal to a respective demodulator (DEMOD) 654. Each demodulator 654 (which includes a receive chain) performs processing complementary to that performed at modulator 622 and provides received symbols. A receive (RX) spatial processor 660 then performs receiver spatial processing on the received symbols from all $N_{ut}$ demodulators 654 to obtain detected symbols, which are estimates of the data symbols sent by the access point. For follow-on calibration, RX spatial processor 660 provides (1) a calibrated downlink channel response estimate, $\hat{H}_{cdn}$, obtained from a downlink MIMO pilot transmitted by the access point and (2) received symbols for a downlink steered reference transmitted by the access point. An RX data processor 670 processes (e.g., symbol demaps, deinterleaves, and decodes) the detected symbols and provides decoded data. The decoded data may include recovered traffic data, signaling, and so on, which are provided to a data sink 672 for storage and/or a controller 680 for further processing.

The processing for the uplink may be the same or different from the processing for the downlink. Data and signaling are processed (e.g., coded, interleaved, and modulated) by a TX data processor 690, which similarly to TX processor 610 receives data from a data source 688, and further spatially processed and multiplexed with pilot symbols by TX spatial processor 692 to obtain transmit symbols. The transmit symbols are further processed by modulators 654a through 654ut to obtain $N_{ut}$ uplink modulated signals, which are then transmitted via $N_{ut}$ antennas 652a through 652ut to the access point. User terminal 150 sends back the correction $\hat{K}_{ap}$ for the initial calibration and may send back the calibration error matrix $Q_{ap,final}$ for the follow-on calibration, for the implementation described above. At access point 110, the uplink modulated signals are received by antennas 624, demodulated by demodulators 622, and processed by an RX spatial processor 640 and an RX data processor 642 in a complementary to that performed at the user terminal. RX data processor 642 provides the matrices $\hat{K}_{ap}$ and $Q_{ap,final}$ to controller 630 and/or, similarly to RX data processor 670, data sink 644.

For the initial calibration, the access point and user terminal transmit MIMO pilots on the downlink and uplink, respectively. Each entity derives the effective channel response estimate for its link. One entity (e.g., the access point) sends the channel estimate to the other entity (e.g., the user terminal) for computation of the correction matrices $\hat{K}_{ap}$ and $\hat{K}_{ut}$ for both entities. The entity that derives the correction matrices uses its correction matrix and sends the other correction matrix back to the other entity. For the follow-on calibration, one entity (e.g., the access point) transmits both the steered reference and MIMO pilot. The other derives the calibration error matrices $Q_{ap,final}$ and $Q_{ut,final}$ for both entities based on the received pilots, as described above. The entity that derives the calibration error matrices uses its calibration error matrix and may send the other calibration error matrix back to the other entity (e.g., if the errors are sufficiently large).

Controllers 630 and 680 control the operation of various processing units at the access point and user terminal, respectively. Controllers 630 and/or 680 may also perform processing for the initial and follow-on calibration (e.g., the computation for the correction matrices $\hat{K}_{ap}$ and $\hat{K}_{ut}$ and the calibration error matrices $Q_{ap,final}$ and $Q_{ut,final}$). Memory units 632 and 682 store data and program codes used by controllers 630 and 680, respectively.

The calibration techniques described herein may be implemented by various means. For example, these techniques may be implemented in hardware, software, or a combination thereof. For a hardware implementation, the processing units used to perform the initial and/or follow-on calibration may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the calibration techniques may be implemented with modules (e.g., procedures, functions, and so on) that perform the functions described herein. The software codes may be stored in a memory unit (e.g., memory unit 632 or 682 in FIG. 6) and executed by a processor (e.g., controller 630 or 680). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of calibrating downlink and uplink channels in a wireless multiple-input multiple-output (MIMO) communication system, comprising:
    deriving a first transmit matrix based on a first pilot received via a MIMO channel between a transmitting entity and a receiving entity;
    deriving a second transmit matrix based on a MIMO channel response estimate and first and second calibration error matrices, the MIMO channel response estimate being an estimate of a response of the MIMO channel and derived based on a second pilot received via the MIMO channel, the first calibration error matrix containing estimates of errors in a first correction matrix used to account for responses of transmit and receive chains at the transmitting entity, and the second calibration error matrix containing estimates of errors in a second correction matrix used to account for responses of transmit and receive chains at the receiving entity; and
    revising the first and second calibration error matrices based on the first and second transmit matrices.

2. The method of claim 1, wherein the first pilot is a steered pilot received via a plurality of eigenmodes of the MIMO channel.

3. The method of claim 1, wherein the second pilot is a MIMO pilot comprised of a plurality of pilot transmissions sent from a plurality of transmit antennas at the transmitting entity, where the pilot transmission from each transmit antenna is identifiable by the receiving entity.

4. The method of claim 1, wherein the deriving the second transmit matrix comprises
  decomposing the MIMO channel response estimate to obtain a first matrix of eigenvectors for the MIMO channel,
  computing a second matrix of eigenvectors for the MIMO channel based on the MIMO channel response estimate and the first and second calibration error matrices, and
  computing the second transmit matrix based on the second matrix of eigenvectors and the MIMO channel response estimate.

5. The method of claim 4, wherein the deriving the second transmit matrix further comprises
  processing the second matrix of eigenvectors to obtain a third matrix of eigenvectors, wherein the processing on the second matrix of eigenvectors matches processing performed by the transmitting entity to generate a transmit matrix based on a steered pilot received by the transmitting entity from the receiving entity, and wherein the second transmit matrix is computed based on the third matrix of eigenvectors and the MIMO channel response estimate.

6. The method of claim 5, wherein the processing the second matrix of eigenvectors comprises
  performing orthogonalization on the eigenvectors in the second matrix to derive orthogonal eigenvectors for the third matrix.

7. The method of claim 1, wherein the first and second calibration error matrices are revised based on a minimum mean square error (MMSE) adaptive procedure.

8. The method of claim 1, wherein the revising the first and second calibration error matrices comprises
  computing an error matrix as a difference between the first and second transmit matrices,
  deriving partial derivatives for elements in the error matrix with respect to selected ones of elements in the first and second calibration error matrices,
  computing an update vector based on the partial derivatives and the error matrix, and
  updating the first and second calibration error matrices with the update vector.

9. The method of claim 8, wherein the deriving the partial derivatives comprises
  deriving a revised second transmit matrix based on the MIMO channel response estimate, the first and second calibration error matrices, and an error vector,
  computing a revised error matrix as a difference between the first transmit matrix and the revised second transmit matrix, and
  computing the partial derivatives based on the error matrix and the revised error matrix.

10. The method of claim 8, wherein the error matrix and the first and second calibration error matrices contain complex-valued elements, each complex-valued element having a real component and an imaginary component, and wherein the partial derivatives are derived separately for the real and imaginary components.

11. The method of claim 8, wherein the revising the first and second calibration error matrices further comprises
  forming a matrix with the partial derivatives, and wherein the update vector is computed based on the error matrix and an inverse of the matrix of the partial derivatives.

12. The method of claim 8, wherein the selected ones of the elements in the first and second calibration error matrices include all diagonal elements, except for upper leftmost elements, in the first and second calibration error matrices.

13. The method of claim 8, wherein the revising the first and second calibration error matrices further comprises
  repeating the computing the error matrix, deriving the partial derivatives, computing the update vector, and updating the first and second calibration error matrices for a plurality of times until the update vector satisfies a termination condition.

14. The method of claim 1, wherein the first and second calibration error matrices are revised based on a steepest descent adaptive procedure.

15. The method of claim 1, wherein the revising the first and second calibration error matrices comprises
  computing an error matrix as a difference between the first and second transmit matrices,
  computing an aggregate error based on the error matrix,
  deriving partial derivatives for the aggregate error with respect to selected ones of elements in the first and second calibration error matrices, and
  updating the first and second calibration error matrices with the partial derivatives.

16. The method of claim 15, wherein the aggregate error is computed as a sum of squares of magnitude of elements in the error matrix.

17. The method of claim 15, wherein the revising the first and second calibration error matrices further comprises
  repeating the computing the error matrix, computing the aggregate error, deriving the partial derivatives, and updating the first and second calibration error matrices for a plurality of times until the aggregate error satisfies a termination condition.

18. The method of claim 1, further comprising:
  updating the second correction matrix with the second calibration error matrix.

19. The method of claim 1, wherein the first correction matrix is updated with the first calibration error matrix.

20. The method of claim 1, wherein the receiving entity is a user terminal and the transmitting entity is an access point in a time division duplex (TDD) MIMO system.

21. The method of claim 1, wherein the system utilizes orthogonal frequency division multiplexing (OFDM), and wherein a set of first and second calibration error matrices is derived for each of a plurality of subbands based on the first and second pilots received on the subbands.

22. An apparatus in a wireless multiple-input multiple-output (MIMO) communication system, comprising:
  a controller operative to derive a first transmit matrix based on a first pilot received via a MIMO channel between a transmitting entity and a receiving entity, derive a second transmit matrix based on a MIMO channel response estimate and first and second calibration error matrices, the MIMO channel response estimate being an estimate of a response of the MIMO channel and derived based on a second pilot received via the MIMO channel, the first calibration error matrix containing estimates of errors in a first correction matrix used to account for responses of transmit and receive chains at the transmitting entity, and the second calibration error matrix containing estimates of errors in a second correction matrix used to account for responses of transmit and receive chains at the receiving entity, and revise the first and second calibration error matrices based on the first and second transmit matrices; and a spatial processor operative to multiply data symbols with the second correction matrix prior to transmission via the MIMO channel.

23. The apparatus of claim 22, wherein the first pilot is a steered pilot received via a plurality of eigenmodes of the MIMO channel, and wherein the second pilot is a MIMO pilot comprised of a plurality of pilot transmissions sent from a plurality of transmit antennas at the transmitting entity, where the pilot transmission from each transmit antenna is identifiable by the receiving entity.

24. The apparatus of claim 22, wherein the controller is further operative to revise the first and second calibration error matrices based on an adaptive procedure that iteratively adjusts the first and second calibration error matrices to reduce error between the first and second transmit matrices.

25. The apparatus of claim 22, wherein the controller is further operative to
decompose the MIMO channel response estimate to obtain a first matrix of eigenvectors for the MIMO channel,
compute a second matrix of eigenvectors for the MIMO channel based on the MIMO channel response estimate and the first and second calibration error matrices, and
compute the second transmit matrix based on the second matrix of eigenvectors and the MIMO channel response estimate.

26. The apparatus of claim 22, wherein the controller is further operative to
compute an error matrix as a difference between the first and second transmit matrices,
derive partial derivatives for elements in the error matrix with respect to selected ones of elements in the first and second calibration error matrices,
compute an update vector based on the partial derivatives and the error matrix,
update the first and second calibration error matrices with the update vector, and
repeat the computation of the error matrix, derivation of the partial derivatives, computation of the update vector, and updating of the first and second calibration error matrices for a plurality of times until the update vector satisfies a termination condition.

27. The apparatus of claim 22, wherein the controller is further operative to
compute an error matrix as a difference between the first and second transmit matrices,
compute an aggregate error based on the error matrix,
derive partial derivatives for the aggregate error with respect to selected ones of elements in the first and second calibration error matrices,
update the first and second calibration error matrices with the partial derivatives, and
repeat the computation of the error matrix, computation of the aggregate error, derivation of the partial derivatives, and updating of the first and second calibration error matrices for a plurality of times until the aggregate error satisfies a termination condition.

28. An apparatus in a wireless multiple-input multiple-output (MIMO) communication system, comprising:
means for deriving a first transmit matrix based on a first pilot received via a MIMO channel between a transmitting entity and a receiving entity;
means for deriving a second transmit matrix based on a MIMO channel response estimate and first and second calibration error matrices, the MIMO channel response estimate being an estimate of a response of the MIMO channel and derived based on a second pilot received via the MIMO channel, the first calibration error matrix containing estimates of errors in a first correction matrix used to account for responses of transmit and receive chains at the transmitting entity, and the second calibration error matrix containing estimates of errors in a second correction matrix used to account for responses of transmit and receive chains at the receiving entity; and
means for revising the first and second calibration error matrices based on the first and second transmit matrices.

29. The apparatus of claim 28, wherein the first pilot is a steered pilot received via a plurality of eigenmodes of the MIMO channel, and wherein the second pilot is a MIMO pilot comprised of a plurality of pilot transmissions sent from a plurality of transmit antennas at the transmitting entity, where the pilot transmission from each transmit antenna is identifiable by the receiving entity.

30. The apparatus of claim 28, further comprising:
means for decomposing the MIMO channel response estimate to obtain a first matrix of eigenvectors for the MIMO channel;
means for computing a second matrix of eigenvectors for the MIMO channel based on the MIMO channel response estimate and the first and second calibration error matrices; and
means for computing the second transmit matrix based on the second matrix of eigenvectors and the MIMO channel response estimate.

31. The apparatus of claim 28, further comprising:
means for computing an error matrix as a difference between the first and second transmit matrices;
means for deriving partial derivatives for elements in the error matrix with respect to selected ones of elements in the first and second calibration error matrices;
means for computing an update vector based on the partial derivatives and the error matrix;
means for updating the first and second calibration error matrices with the update vector; and
means for repeating the computation of the error matrix, derivation of the partial derivatives, computation of the update vector, and updating of the first and second calibration error matrices for a plurality of times until the update vector satisfies a termination condition.

32. The apparatus of claim 28, further comprising:
means for computing an error matrix as a difference between the first and second transmit matrices;
means for computing an aggregate error based on the error matrix;
means for deriving partial derivatives for the aggregate error with respect to selected ones of elements in the first and second calibration error matrices;
means for updating the first and second calibration error matrices with the partial derivatives; and
means for repeating the computation of the error matrix, computation of the aggregate error, derivation of the partial derivatives, and updating of the first and second calibration error matrices for a plurality of times until the aggregate error satisfies a termination condition.

33. A method of calibrating downlink and uplink channels in a wireless multiple-input multiple-output (MIMO) communication system, comprising:
performing a first calibration based on downlink and uplink channel response estimates for a MIMO channel between a transmitting entity and a receiving entity to obtain first and second correction matrices, the first correction matrix being used to account for responses of transmit and receive chains at the transmitting entity and the second correction matrix being used to account for responses of transmit and receive chains at the receiving entity; and performing a second calibration based on first and second pilots received via the MIMO channel to obtain first and second calibration error matrices, the first calibration error matrix containing estimates of errors in the first correction matrix and the second calibration error matrix containing estimates of errors in the second correction matrix.

34. The method of claim 33, further comprising:
updating the second correction matrix with the second calibration error matrix.

35. The method of claim 33, wherein the first pilot is a steered pilot received via a plurality of eigenmodes of the MIMO channel, and wherein the second pilot is a MIMO pilot comprised of a plurality of pilot transmissions sent from a plurality of transmit antennas at the transmitting entity, where the pilot transmission from each transmit antenna is identifiable by the receiving entity.

36. The method of claim 33, wherein the performing the second calibration comprises
deriving a first transmit matrix based on the first pilot,
deriving a second transmit matrix based on a MIMO channel response estimate obtained from the second pilot, and
revising the first and second calibration error matrices based on the first and second transmit matrices.

37. The method of claim 36, wherein the first and second calibration error matrices are revised using an adaptive procedure that iteratively adjusts the first and second calibration error matrices to reduce error between the first and second transmit matrices.

38. An apparatus in a wireless multiple-input multiple-output (MIMO) communication system, comprising:
a controller operative to perform a first calibration based on downlink and uplink channel response estimates for a MIMO channel between a transmitting entity and a receiving entity to obtain first and second correction matrices, the first correction matrix being used to account for responses of transmit and receive chains at the transmitting entity and the second correction matrix being used to account for responses of transmit and receive chains at the receiving entity, and perform a second calibration based on first and second pilots received via the MIMO channel to obtain first and second calibration error matrices, the first calibration error matrix containing estimates of errors in the first correction matrix and the second calibration error matrix containing estimates of errors in the second correction matrix; and a spatial processor operative to multiply data symbols with the second correction matrix prior to transmission via the MIMO channel.

39. The apparatus of claim 38, wherein the controller is further operative to
derive a first transmit matrix based on the first pilot,
derive a second transmit matrix based on a MIMO channel response estimate obtained from the second pilot, and
revise the first and second calibration error matrices based on the first and second transmit matrices.

40. The apparatus of claim 39, wherein the controller is further operative to revise the first and second calibration error matrices using an adaptive procedure that iteratively adjusts the first and second calibration error matrices to reduce error between the first and second transmit matrices.

41. An apparatus in a wireless multiple-input multiple-output (MIMO) communication system, comprising:
means for performing a first calibration based on downlink and uplink channel response estimates for a MIMO channel between a transmitting entity and a receiving entity to obtain first and second correction matrices, the first correction matrix being used to account for responses of transmit and receive chains at the transmitting entity and the second correction matrix being used to account for responses of transmit and receive chains at the receiving entity; and means for performing a second calibration based on first and second pilots received via the MIMO channel to obtain first and second calibration error matrices, the first calibration error matrix containing estimates of errors in the first correction matrix and the second calibration error matrix containing estimates of errors in the second correction matrix.

42. The apparatus of claim 41, wherein the means for performing the second calibration comprises
means for deriving a first transmit matrix based on the first pilot,
means for deriving a second transmit matrix based on a MIMO channel response estimate obtained from the second pilot, and
means for revising the first and second calibration error matrices based on the first and second transmit matrices.

43. The apparatus of claim 42, wherein the first and second calibration error matrices are revised using an adaptive procedure that iteratively adjusts the first and second calibration error matrices to reduce error between the first and second transmit matrices.

* * * * *